July 7, 1931.  J. J. APPEL  1,813,094
TIRE CARRIER
Filed Sept. 10, 1928  2 Sheets-Sheet 2
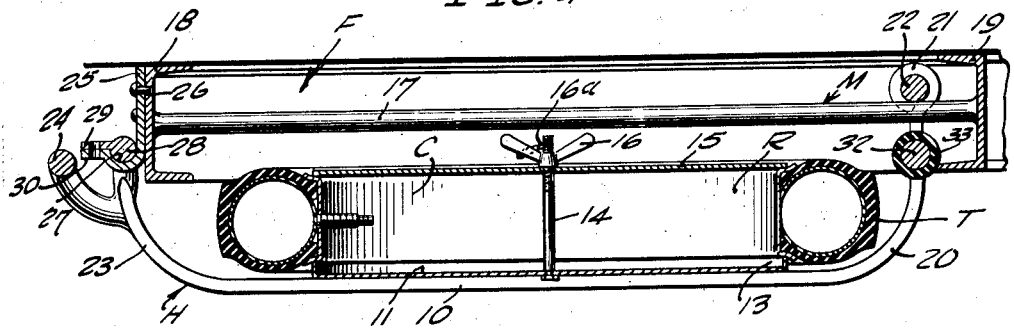
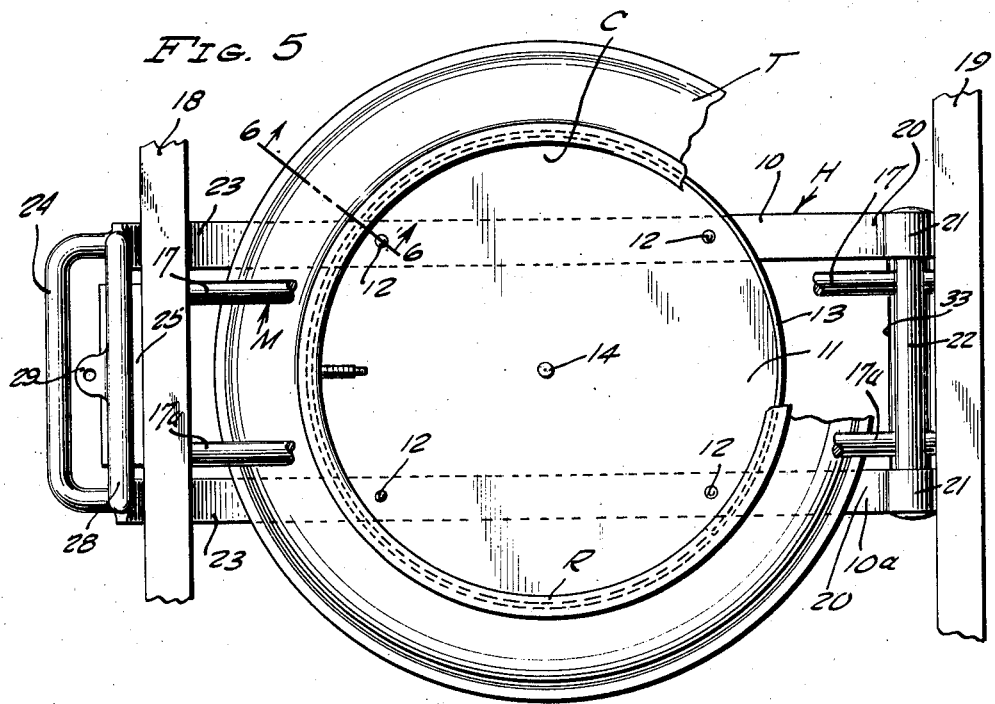
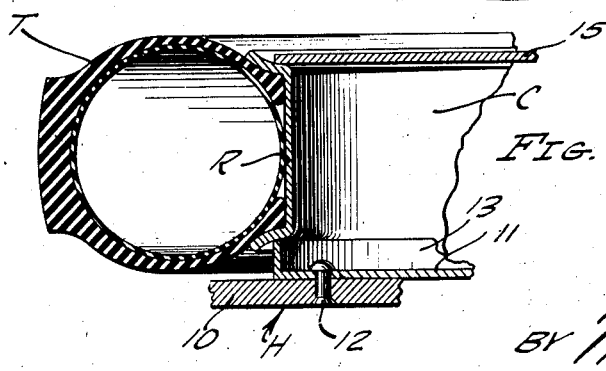
INVENTOR
JOSEPH J. APPEL
BY Munn & Co.
ATTORNEYS Patented July 7, 1931

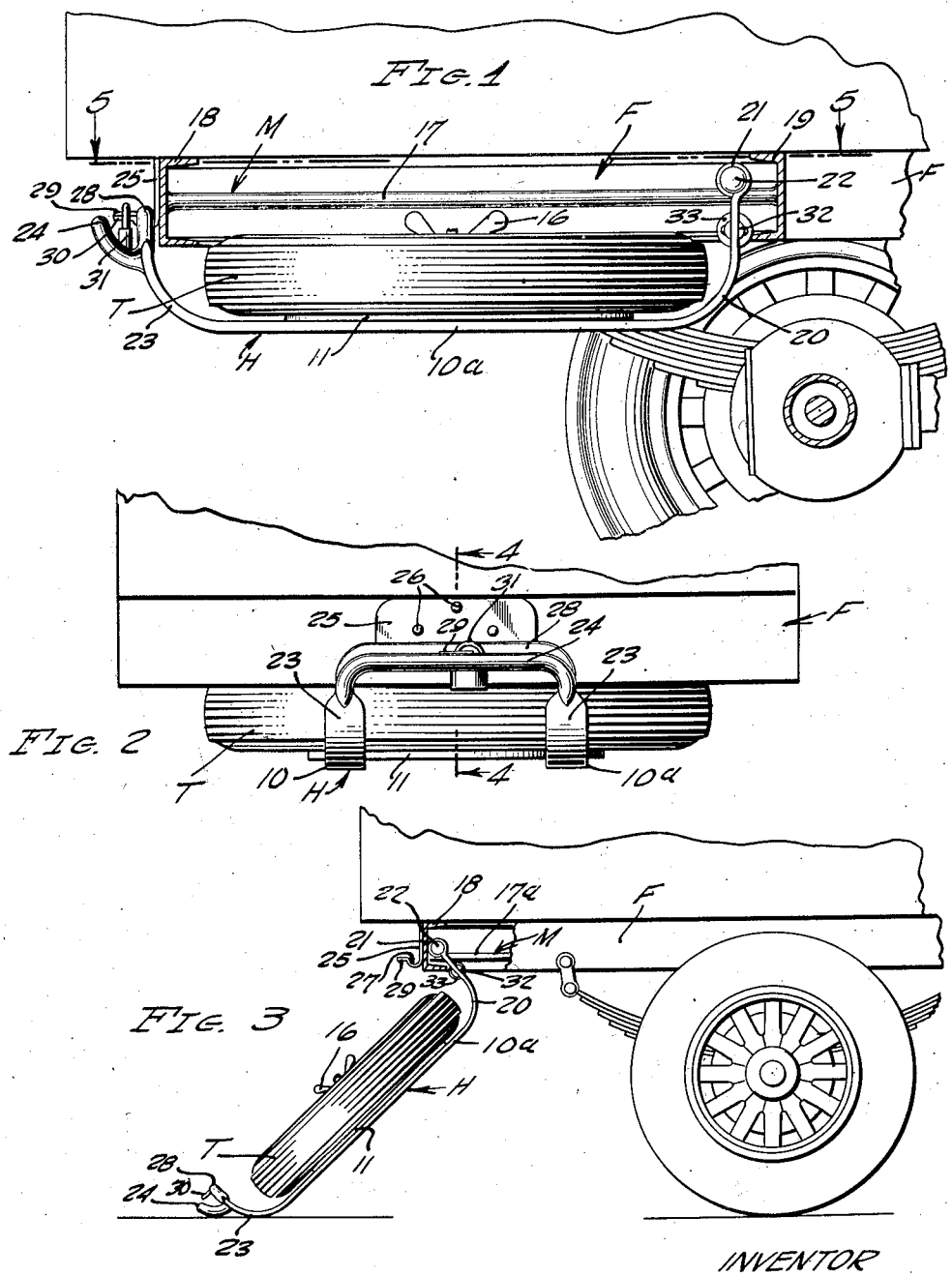

1,813,094

UNITED STATES PATENT OFFICE

JOSEPH J. APPEL, OF OSDICK, CALIFORNIA

TIRE CARRIER

Application filed September 10, 1928. Serial No. 304,987.

My invention relates to and has for a purpose the provision of a tire carrier particularly adapted, although not necessarily, for use on commercial vehicles such as trucks, trailers, busses, etc., and by which a spare tire can be compactly stored in an elevated position underneath the body of the vehicle and yet rendered conveniently accessible for removal from and replacement on the tire carrier with the utmost ease and dispatch.

It is a further purpose of my invention to provide a tire carrier which is preferably mounted underneath the body of the vehicle for movement in such manner as to render the carrier capable of being manually manipulated to an elevated and retracted position wherein the tire will be disposed substantially horizontally beneath the body of the vehicle, for storage, and a lowered and projected position wherein the carrier is adapted to rest upon the ground with the tire supported by the carrier in a downwardly and outwardly inclined position with respect to the vehicle and sufficiently beyond the vehicle body as to be conveniently accessible for removal from the carrier, all in such manner that the carrier can be manipulated by the operator, while the latter remains clear of the vehicle, and without necessitating lifting of the tire to remove it from or replace it on the tire carrier, as is a decided advantage when handling heavy tires.

It is a further purpose of my invention to provide a tire carrier which is capable of being securely locked in the position wherein the tire is stored underneath the vehicle, and the tire secured against removal from the carrier, to the end that theft of the tire will be positively prevented.

I will describe only one form of tire carrier embodying my invention and will then point out the novel features thereof in claims.

In the accompanying drawings

Fig. 1 is a view showing in side elevation one form of tire carrier embodying my invention, applied to a vehicle, with a tire stored by the carrier underneath the vehicle body;

Fig. 2 is a view in rear elevation of the tire carrier shown in Fig. 1;

Fig. 3 is a view similar to Fig. 1, and illustrating a tire supported by the carrier in a position wherein it is accessible for removal from the carrier;

Fig. 4 is a sectional view on the line 4—4 of Fig. 2 and looking in the direction of the arrows;

Fig. 5 is a top plan view of the carrier, partly broken away; and

Fig. 6 is an enlarged fragmentary view on the line 6—6 of Fig. 5 and looking in the direction of the arrows.

Referring specifically to the drawings in which similar reference characters designate similar parts in each of the several views, my invention in its present embodiment broadly comprises a tire holder designated generally at H, and a means designated generally at M by which the holder is adapted to be mounted on a vehicle underneath the body thereof for movement in such manner as to permit one or more tires to be compactly stored in an elevated position underneath the vehicle body, yet rendered conveniently accessible for removal from the holder with the utmost ease and dispatch on the part of an operator.

The tire holder H in the present instance comprises a pair of metal bars 10 and 10$^a$ secured in side by side spaced relation to a circular plate 11 by rivets 12, the plate 11 having an upstanding peripheral flange 13 on which is adapted to rest the rim R of a conventional tire T, with the tire held clear of the bars by the flange so as to prevent rubbing of the tire on the bars with the attendant wear.

A threaded stud 14 is secured centrally to the plate 11, while a second plate 15 of circular form is provided with a central opening adapted to receive the stud and to rest at its marginal edge upon the opposite side of the tire rim R as shown in Fig. 4. A thumb nut 16 is adapted to be threaded on the stud 14 to co-operate with the latter in firmly clamping the tire T between the plates 11 and 15.

To lock the tire against removal from the tire holder H, the stud 14 is provided adjacent its free end with an opening through which the hasp of a padlock 16ᵃ is adapted to be extended. The plates 11 and 15, stud 14 and nut 16 thus broadly co-operate to provide a means for firmly supporting the tire in a fixed position on the tire holder, while the padlock broadly constitutes a means for locking the tire on the holder against theft. The plates 11 and 15 co-operate with the rim R to define a compartment C in which tools such as those necessary for use in changing a tire on the vehicle, are adapted to be stored.

In the present instance the mounting means M for the tire holder H comprises a pair of rods 17 and 17ᵃ which are welded or otherwise secured at their ends to transverse members 18 and 19 of the conventional chassis frame F of the vehicle, so that the rods will be fixedly supported from the frame substantially horizontally in side by side spaced relation, and will extend lengthwise of the frame at the rear end of the latter as clearly shown in Fig. 1. The rods 17 and 17ᵃ constitute runners for slidably and pivotally supporting the tire holder H, and in the present instance the forward extremities of the bars 10 and 10ᵃ are curved upwardly as indicated at 20 and terminate in alined sleeves 21 in which the ends of a headed pin 22 are mounted, the pin spanning the space between the bars and resting upon the rods 17 and 17ᵃ so as to extend transversely of the latter as clearly shown in Fig. 5.

The tire holder H is thus mounted for movement on the vehicle underneath the body thereof so as to be rendered capable of being moved to an elevated and retracted position as shown in Fig. 1 wherein a tire on the holder is disposed substantially horizontally underneath and contiguous to the underside of the vehicle body, or being withdrawn from beneath the vehicle body and swung downward to the lowered and projected position shown in Fig. 3 wherein the tire or the holder is disposed beyond the rear end of the vehicle in an outwardly and downwardly inclined position so as to be conveniently accessible for removal from the holder.

In the position shown in Fig. 3 the rear extremities of the bars 10 and 10ᵃ, which are curved upwardly as indicated at 23, are adapted to rest upon the ground and thus support the tire holder in the inclined position shown, and to permit the holder to be manually manipulated, the rear extremities of the bars 10 and 10ᵃ are bridged by a handle 24 adapted to be readily grasped by an operator.

The tire holder is adapted to be supported in the elevated retracted position shown in Fig. 1, by means of a socket member 25 secured by rivets 26 to the transverse member 18 of the chassis frame F and having a socket 27 in which a head member 28 in the form of a bar also bridging the rear extremities of the bars 10 and 10ᵃ, is adapted to seat to thus co-operate with the rods 17, 17ᵃ and the pin 22 to firmly support the holder in the position shown in Fig. 1.

From the socket member 25 and head member 28 project ears 29 and 30 respectively, provided with openings adapted to register to receive the hasp of a padlock 31 so as to securely lock the tire holder in the position shown in Fig. 1, and to prevent displacement of the holder from the rods 17 and 17ᵃ and prevent excessive rattling of the holder on the rods. To the forward extremities of the bars 10 and 10ᵃ is secured a pin 32 which spans the rods transversely immediately below the latter and is provided with a sleeve 33 of rubber or other suitable material which operates as a cushioning bumper.

The operation of the tire carrier is as follows:

Assuming that the tire holder H is locked in the position shown in Figs. 1 and 4 and that it is desired to remove the tire T from the holder, the padlock 31 is first removed from the ears 29 and 30. With the operator standing in the rear of the vehicle, the handle 24 is grasped and the tire holder swung upwardly about the pin 22 a sufficient amount for the head member 28 to clear the socket 27, after which the tire holder is pulled rearwardly on the rods 17 and 17ᵃ so as to be withdrawn from beneath the vehicle, and swung downwardly to the position shown in Fig. 3 so that it rests upon the ground. The padlock 16ᵃ, nut 16, and plate 15 are now removed in this order from the stud 14, after which the tire T is grasped and can be rolled from the holder to the exclusion of any lifting of the tire, as is a great advantage in handling heavy tires.

Furthermore, it will be appreciated that the aforementioned manipulation of the tire holder can be effected by the operator without assuming any awkward positions or crawling under the vehicle, and can be accomplished with the utmost ease and dispatch while the operator remains entirely clear of the vehicle. It will be clear that the operation of replacing a tire on the tire holder H and restoring the latter to and locking it in the position shown in Fig. 1 is accomplished by the above described operation performed in the reverse order, and all while the operator remains clear of the vehicle.

A further advantage of the tire carrier resides in the fact that when the tire holder H occupies the position shown in Fig. 3, the space underneath the vehicle body will be entirely unobstructed by the tire holder so that should any repairs or inspection of the rear axle assembly be required, this can be accomplished without interference from the tire holder.

Although I have herein shown and described only one form of tire carrier embodying my invention, it is to be understood that various changes and modifications may be made therein without departing from the spirit of the invention and the spirit and scope of the appended claims.

I claim:

1. A tire carrier comprising a tire holder on which a tire is adapted to be mounted, means for mounting the holder for pivotal and sliding movements on a vehicle underneath the body thereof to render the holder capable of occupying an elevated retracted position and a lowered projected position, and means for retaining the holder in the first mentioned position comprising a socket member adapted to be secured to the vehicle, and a head member on the tire holder adapted to seat in the socket member.

2. A tire carrier comprising a tire holder on which a tire is adapted to be mounted, means for mounting the holder for pivotal and sliding movements on a vehicle underneath the body thereof to render the holder capable of occupying an elevated retracted position and a lowered projected position, a socket member adapted to be secured to the vehicle, a head member on the tire holder adapted to seat in the socket member to retain the tire holder in the first mentioned position, and ears on the head and socket members adapted to register to receive the hasp of a padlock to lock the tire holder in the first mentioned position.

3. A tire carrier comprising a tire holder on which a tire is adapted to be mounted, means for mounting the holder for pivotal and sliding movements on a vehicle underneath the body thereof to render the holder capable of occupying an elevated retracted position and a lowered projected position, and means for retaining the holder in the first mentioned position, said mounting means comprising a pair of rods adapted to be fixed to the vehicle in side by side spaced relation, and a pin on the tire holder spanning and resting upon the rods.

4. A tire carrier comprising a tire holder on which a tire is adapted to be mounted, means for mounting the holder for pivotal and sliding movements on a vehicle underneath the body thereof to render the holder capable of occupying an elevated retracted position and a lowered projected position, and means for retaining the holder in the first mentioned position, the tire holder comprising a pair of bars in side by side spaced relation, and a plate secured to the bars, having an upstanding flange on which the tire is adapted to be mounted, and said mounting means comprising alined sleeves on one extremity of the bars, a pin spanning and mounted in the sleeves, and a pair of rods adapted to be secured to the vehicle, and on which the pin rests so that pivotal and sliding movements of the tire holder can be effected.

5. A tire carrier comprising a tire holder on which a tire is adapted to be mounted, means for mounting the holder for pivotal and sliding movements on a vehicle underneath the body thereof to render the holder capable of occupying an elevated retracted position and a lowered projected position, means for retaining the holder in the first mentioned position, the tire holder comprising a pair of bars in side by side spaced relation, and a plate secured to the bars, having an upstanding flange on which the tire is adapted to be mounted, and means for securing the tire against displacement from the flange comprising a threaded stud projecting from the plate, a second plate through which the stud is adapted to project, and a nut for the stud by which the first and second plates are caused to co-operate in clamping the tire therebetween.

6. A tire carrier comprising a pair of rods adapted to be secured in side by side spaced relation to a vehicle underneath the body thereof in substantially a horizontal position, a tire holder including a pair of bars in side by side spaced relation, and a plate secured to the bars, having an upstanding flange on which a tire is adapted to be mounted, a threaded stud projecting from the plate, a second plate, a nut for the stud by which the first and second plates are caused to co-operate in clamping the tire therebetween, alined sleeves on one extremity of the bars, a pin spanning and mounted in the sleeves, and resting across the rods to support the tire holder for pivotal and sliding movements on the rods, a socket member adapted to be secured to the vehicle, a head member on the tire holder adapted to seat in the socket member to support the tire holder in an elevated position, and a handle on the tire holder by which the latter is adapted to be manipulated.

7. A tire carrier comprising a tire holder on which a tire is adapted to be mounted, means for mounting the holder for pivotal and sliding movements on a vehicle underneath the body thereof to render the holder capable of occupying an elevated retracted position and a lowered projected position, a socket member adapted to be secured to the vehicle, and a head member on the tire holder adapted to seat in the socket member to retain the tire holder in the first mentioned position and a lowered projected position, 8. A tire carrier comprising a tire holder on which a tire is adapted to be mounted, means for mounting the holder for pivotal and sliding movements on a vehicle underneath the body thereof to render the holder capable of occupying an elevated retracted position and a lowered projected position, and means for positively maintaining the holder connected to the mounting means when the holder is moved to its projected position.

Signed at Osdick in the county of San Bernardino and State of Calif. this 22 day of August, 1928 A. D.

JOSEPH J. APPEL.